L. B. KAVANAGH.
DEVICE FOR CUTTING AND EMBOSSING SHEET MATERIAL.
APPLICATION FILED OCT. 20, 1915.
1,183,301. Patented May 16, 1916.
2 SHEETS—SHEET 2.
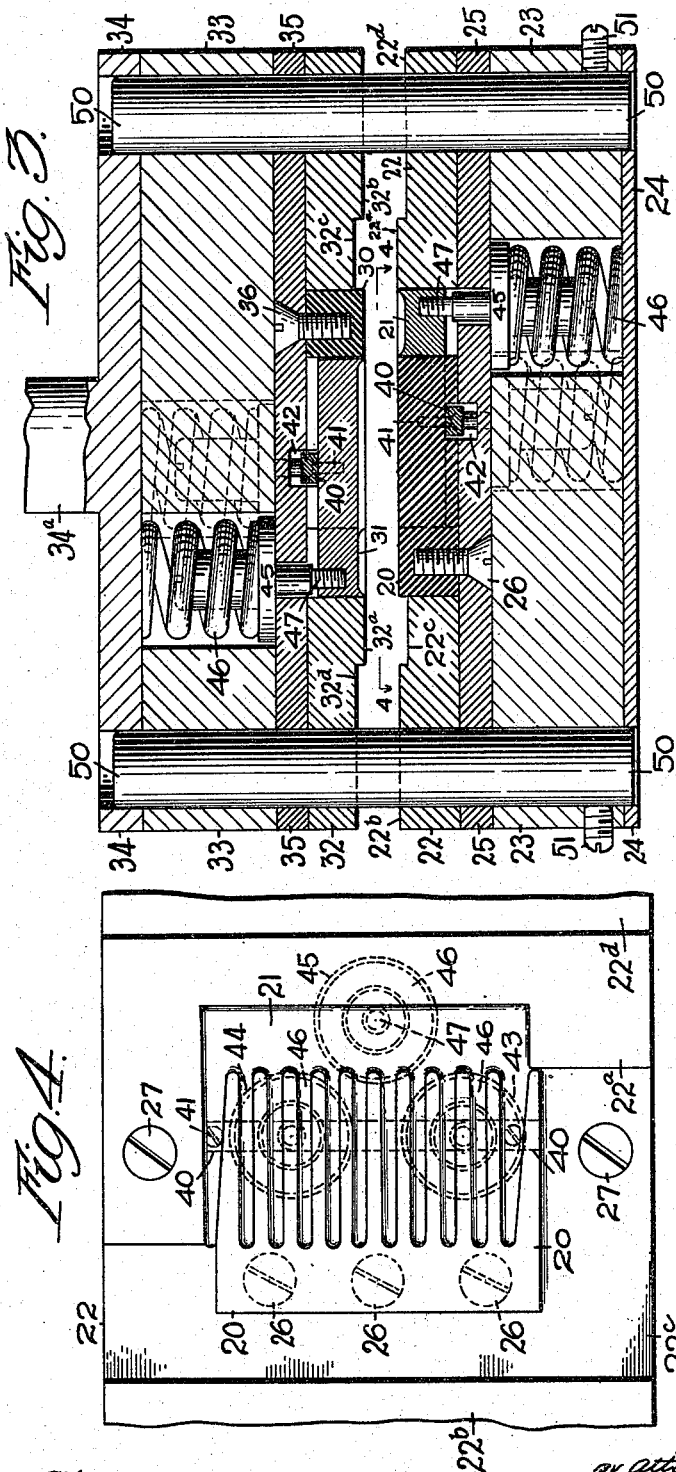
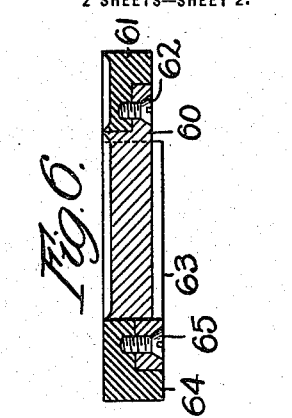
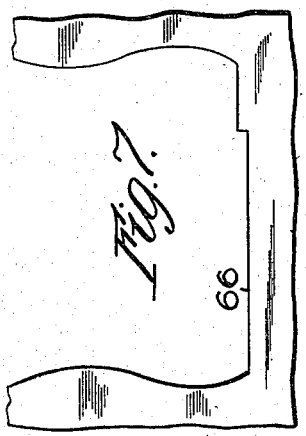
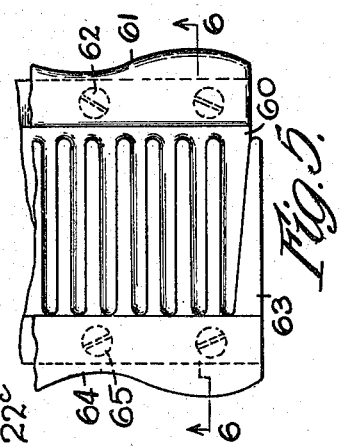

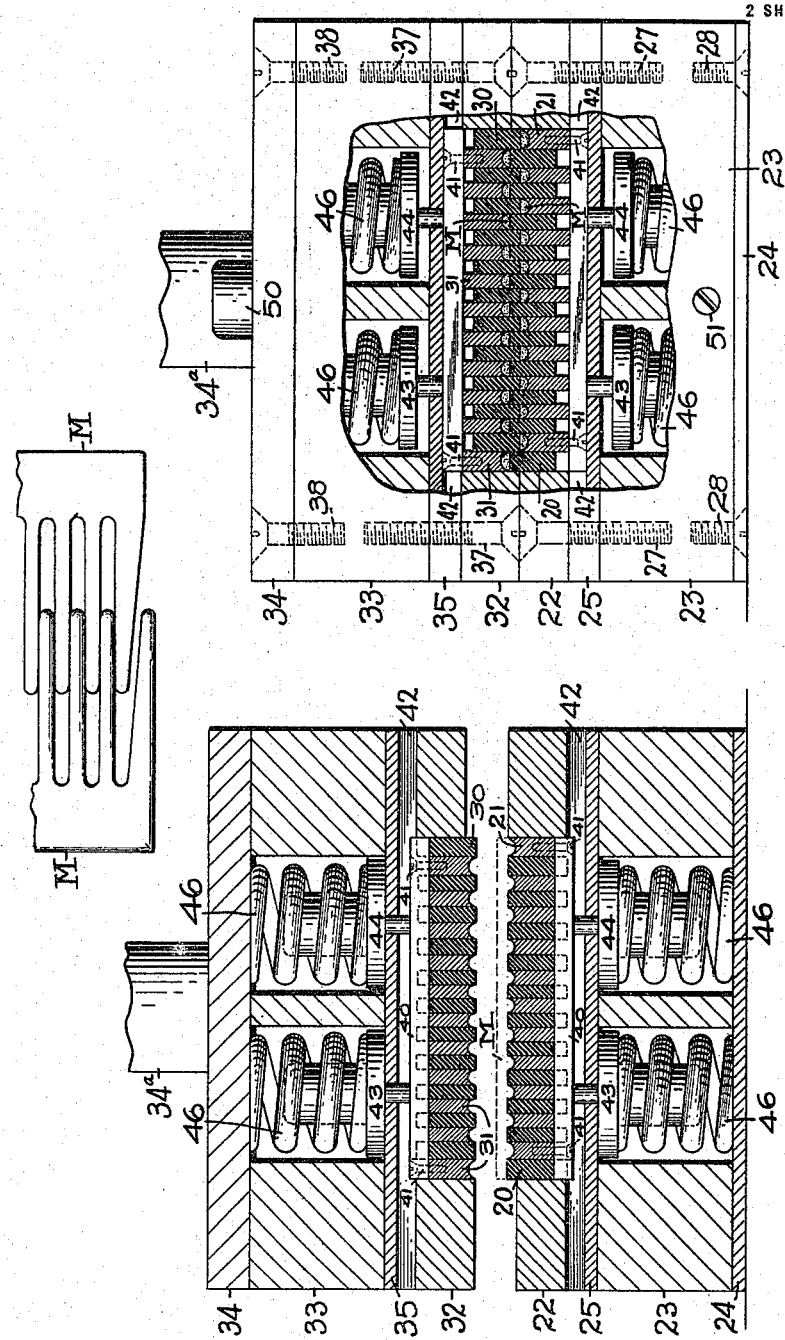

UNITED STATES PATENT OFFICE.

LIONEL B. KAVANAGH, OF LEOMINSTER, MASSACHUSETTS.

DEVICE FOR CUTTING AND EMBOSSING SHEET MATERIAL.

1,183,301.   Specification of Letters Patent.   Patented May 16, 1916.

Application filed October 20, 1915. Serial No. 56,983.

*To all whom it may concern:*

Be it known that I, LIONEL B. KAVANAGH, a citizen of the United States, residing at Leominster, in the county of Worcester and State of Massachusetts, have invented a new and useful Device for Cutting and Embossing Sheet Material, of which the following is a specification.

This invention relates to a device for cutting and embossing sheet material, the invention being capable of general application but being more particularly designed for use in the manufacture of combs and similar articles from sheet celluloid.

It is the general object of my invention to provide coöperating cutting and embossing dies for the purpose defined which shall simultaneously cut and emboss a pair of combs or similar articles at each stroke of the die-holding mechanism.

With this general object in view one feature of my invention relates to a construction in cutting and embossing devices by which the dies are made self-stripping, thereby rendering unnecessary the provision of separate stripping devices.

A further feature of my invention relates to a construction in cutting and embossing devices in which the thin outer edges of the embossing dies shall be at all times reinforced by the relatively rigid parts of the cutting devices.

Other important features of my invention relate to the positioning of one cutting die and one embossing die in each of the two relatively movable parts of the device, to the provision of securing means for the embossing dies so constructed that limited movement of each embossing die is permitted relative to the cutting die associated therewith, and to the provision of improved devices for yieldingly supporting the spaced portions of the embossing dies.

Further features of my invention relate to certain arrangements and combinations of parts which will be hereinafter described and more particularly pointed out in the appended claims.

A preferred form of my invention and a modification thereof are shown in the drawings, in which—

Figure 1 is a sectional end elevation of my cutting and embossing device; Fig. 2 is an end elevation, partly in section and showing the parts in the position which they occupy at the end of the operative stroke; Fig. 3 is a sectional side elevation of the device; Fig. 4 is a partial plan view of the lower set of dies, taken within the limits 4—4 indicated on Fig. 3; Fig. 5 is a plan view of a modified form of cutting and embossing dies; Fig. 6 is a sectional elevation taken along the line 6—6 in Fig. 5; Fig. 7 is a partial plan view of a modified cutting plate, and Fig. 8 is a partial plan view of a pair of combs, as produced by the use of this device.

Referring particularly to Figs. 1, 2 and 3, it will be seen that my improved cutting and embossing device comprises two sets of dies secured respectively to a fixed and to a movable member. The lower set of dies comprises a cutting die 20 (Figs. 3 and 4) and an embossing die 21. These dies are inclosed by a cutting plate 22, the plate and the dies being supported on the fixed member which is formed in three parts and comprises a body portion 23, a bottom plate 24 and a cover plate 25. The cutting die 20 is rigidly secured to the cover plate 25 by screws 26 (Fig. 3) and the cutting plate 22 together with the cover plate 25 is secured to the body portion 23 by screws 27 (Figs. 2 and 4). The bottom plate 24 is also secured to the body portion 23 by screws 28 (Fig. 2).

The upper set of dies is substantially similar to the lower set and is supported in substantially the same manner. The upper set comprises a cutting die 30 and an embossing die 31 fitting within a cutting plate 32, and secured to the movable member which comprises a body portion 33, a head 34 and a cover plate 35, these parts being secured together in the manner previously described. The cutting die 30 is secured to the plate 35 by screws 36, the plates 32 and 35 are secured to the body portion 33 by screws 37, and the head 34 is secured to the body portion 33 by screws 38. The head 34 is provided with a cylindrical upward extension 34ᵃ by which it may be secured in a press or other suitable machine (not shown).

From the construction thus far described it will be seen that the cutting dies 20 and 30 and the cutting plates 22 and 32 are all rigidly secured to their respective supporting members. The embossing dies, on the other hand, are movably mounted relatively to their supporting members and also relatively to the cutting dies and cutting plates. The mounting of these embossing dies will now be described.

The embossing dies are yieldingly supported and fit closely within the irregular recesses inclosed by the cutting dies and the cutting plates as clearly shown in Fig. 4, the embossing dies being of less thickness than the cutting dies. A transverse bar 40 is secured by screws 41 to the rear face of each embossing die 21 and 31, each bar being positioned in a groove or slot 42 formed partly in the rear face of the cutting die and partly in the outer face of the cover plate. The bars 40 engage and reinforce the spaced tooth portions of the embossing dies and distribute the outward thrust of certain spring plunges to be now described.

Each embossing die is held in its outer position by plungers 43, 44 and 45 (Figs. 2 and 3). The plungers 43 and 44 are provided with projecting studs which engage the rear face of one of the bars 40, while the plunger 45 is screwed into the rear face of the solid or back portion of one of the embossing dies 21 and 31. The plungers 43, 44 and 45 are mounted in recesses formed in one of the body portions 23 and 33 and are forced outward by heavy spiral springs 46.

The outward movement of each embossing die can be adjusted by turning its screw-threaded plunger 47, by which means the sharp edges of the embossing die can be brought to the exact plane of the cutting die and cutting plate. By the engagement of the plungers 43 and 44 with the transverse bar 40 the outward thrust of these plungers is distributed to the entire series of teeth of the embossing die.

The parts are so disposed that each portion of an embossing die is positioned opposite to a corresponding portion of a cutting die and coöperates therewith. The upper and lower dies are held in alinement by guide pins 50 (Fig. 3) secured in the body portion 23 of the fixed member by set screws 51. The dies are shown in their normal position in Fig. 1 and in Fig. 2 they are shown in the position which they assume at the end of the operative or cutting and embossing stroke.

The outer or working faces of the cutting plates 22 and 32 are not continuous in a single plane but are each formed with alternate raised and depressed portions. The plate 22 has the raised portions 22ª and 22ᵇ (Figs. 3 and 4) and the depressed portions 22ᶜ and 22ᵈ. Similarly the plate 32 has raised portions 32ª and 32ᵇ and depressed portions 32ᶜ and 32ᵈ.

As the dies are brought together, the raised and depressed portions coöperate to permit the fixed and movable members to approach closer to each other, until the embossing dies are forced back against the outer faces of the cover plates 25 and 35 in which position they can rigidly oppose the pressure of the cutting dies and thereby emboss the two combs formed at each operative stroke. The raised portions of the cutting plates also coöperate with the cutting dies in trimming the thin web or waste from the edges of the comb blanks.

Reference to Fig. 2 will show that the two combs M (Fig. 8) have been entirely separated and that each separate tooth of each comb has been embossed upon one side thereof. It will also be seen that the thin outer edges of the embossing dies are all supported and reinforced by the solid fixed cutting dies and cutting plates, so that heavy outward pressure upon the thin edges of the embossing dies cannot cause injury thereto. This is a very important advantage and one which has not been heretofore secured in duplicate cutting and embossing dies.

As the upward movement of the head commences, the springs 46 will force the embossing dies outward to the planes of the cutting dies, each embossing die thus acting as a stripper for its cutting die and plate.

In manufacturing combs it is usual to provide several shapes of back for each different design of comb, the toothed portion of each comb in the set being identical. The tooth cutting dies are comparatively expensive and in order to permit the use of a single set of tooth cutting dies to produce combs having backs of different outlines I have devised the modified cutting and embossing dies shown in Figs. 5 and 6. With this construction each die is formed of a toothed portion and a back portion, the embossing die comprising the toothed portion 60 and the back portion 61 secured thereto by screws 62. The cutting die is similarly composed of a toothed portion 63 and a back portion 64 secured together by screws 65. With this construction the back portions 61 and 64 may be readily removed and other back portions of different outline may be substituted therefor. It will be understood that a separate cutting plate 66 (Fig. 7) is necessarily provided for each different set of backs.

Having thus described my invention it will be evident that changes and modifications can be made therein by those skilled in the art without departing from the spirit and scope thereof as set forth in the claims and I do not wish to be otherwise limited to the details herein disclosed, but

What I claim is:—

1. A device for cutting and embossing sheet material comprising fixed and movable supporting members, a cutting die rigidly secured to each member, and an embossing die movably mounted on each member, each embossing die being positioned to coöperate with the cutting die carried by the opposite member each embossing die being effective to strip the embossed material from its associated cutting die.

2. In a device for cutting and embossing sheet material, a supporting member, a cutting die fixed thereto, an embossing die movably supported on said member, and formed with spaced tooth portions, and a yieldingly supported transverse bar secured to said embossing die, underlying and supporting said tooth portions, and vertically movable therewith.

3. In a device for cutting and embossing sheet material, a supporting member, a cutting die fixed thereto, an embossing die movably supported on said member and formed with spaced tooth portions, a transverse bar secured to said embossing die, underlying said tooth portions, and vertically movable therewith, and spring-pressed plungers engaging said transverse bar to force said embossing die outwardly to the plane of the cutting die.

4. In a device for cutting and embossing sheet material, a supporting member, a cutting die fixed thereto, an embossing die movably supported on said member and formed with spaced tooth portions, a transverse bar secured to said embossing die, underlying said tooth portions, and vertically movable therewith, spring-pressed plungers engaging said transverse bar to force said embossing die outwardly to the plane of the cutting die, and an additional spring-plunger screw-threaded into said embossing die, whereby the outward movement of said die may be adjusted.

5. In a device for cutting and embossing sheet material, a supporting member, a cutting plate fixed thereto, a cutting die rigidly mounted on said member, and an embossing die movably mounted on said member, each of said dies comprising a toothed portion, a detachable back portion and means for securing said parts together, whereby different sets of backs may be interchangeably used with a single tooth portion.

6. A device for cutting and embossing sheet material comprising fixed and movable supporting members, a cutting plate fixed to each member, a cutting die rigidly mounted on each member, and an embossing die movably mounted on each member, said cutting plates forming inclosing frames for said dies and each having its outer surface formed at two different elevations, the depressed portions of one cutting plate coöperating with the raised portions of the other to permit closer approach of the dies.

7. A device for cutting and embossing sheet material comprising fixed and movable supporting members, a cutting die rigidly secured to each member, an embossing die movably mounted on each member, and a cutting plate rigidly secured to each member and inclosing said rigid dies, said cutting die and cutting plate being provided with straight vertical walls closely engaging and supporting the edges of the embossing die in all positions thereof, each embossing die being effective to strip the embossed material from its associated cutting die.

In testimony whereof I have hereunto set my hand.

LIONEL B. KAVANAGH.

Copies of this patent may be obtained for five cents each, by addressing the "Commissioner of Patents, Washington, D. C."